July 2, 1929.  F. J. BERNARD  1,719,498
COFFEE PERCOLATOR
Filed May 16, 1928  2 Sheets-Sheet 1
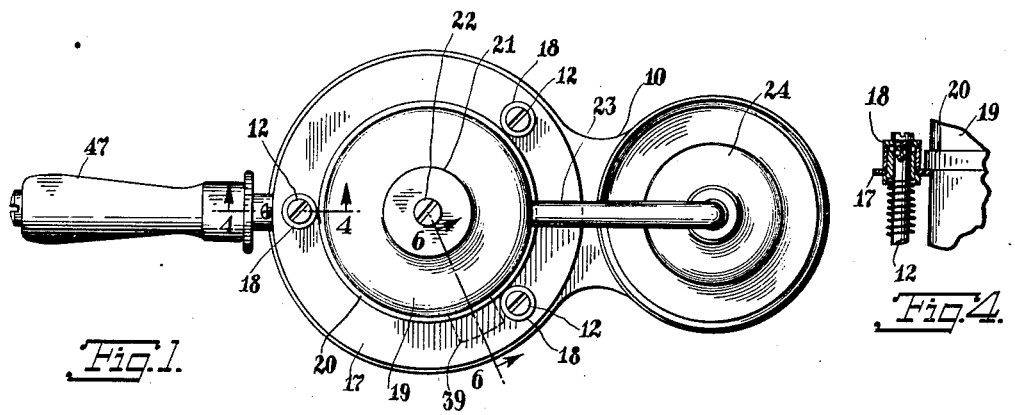
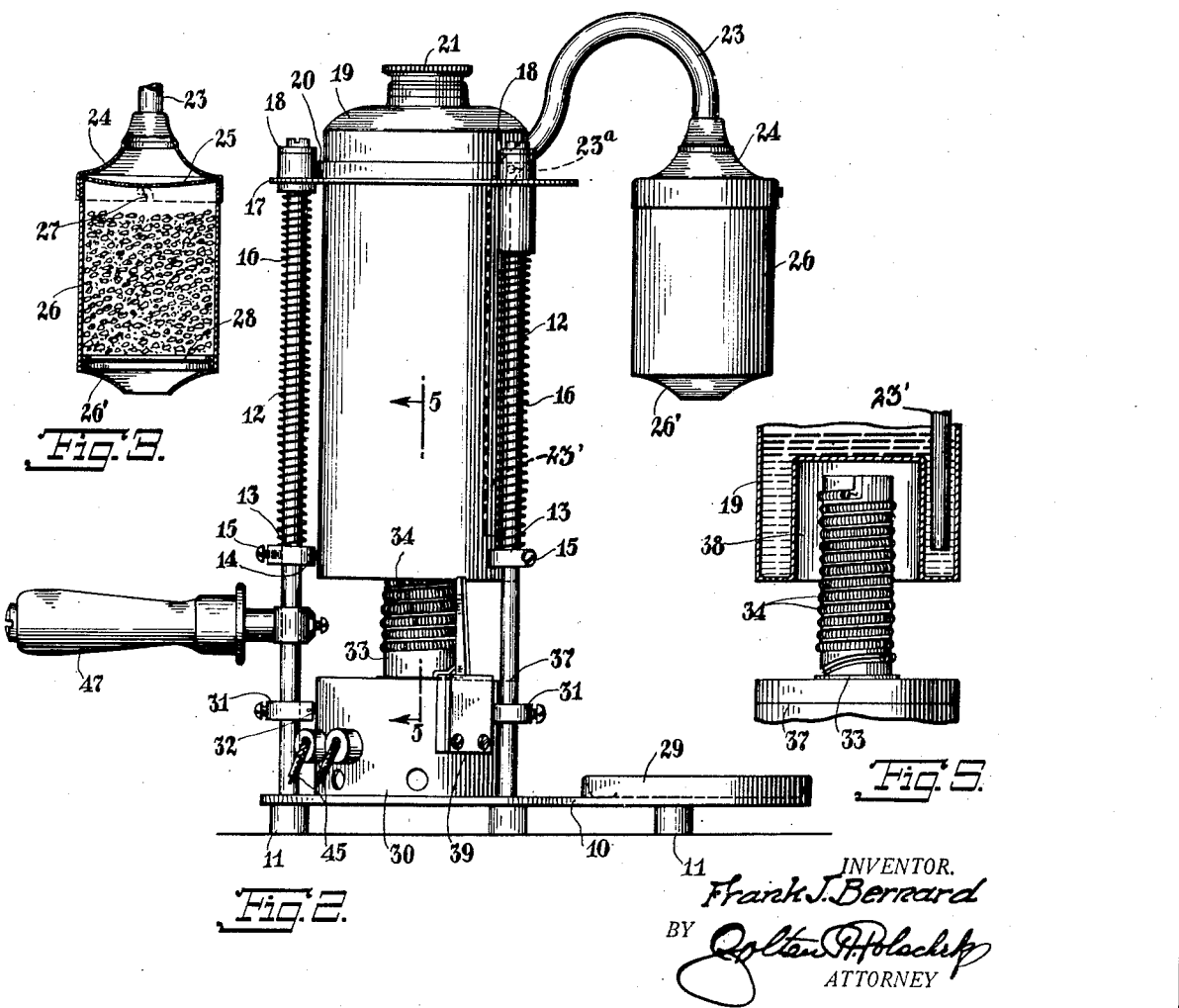
INVENTOR.
Frank J. Bernard
BY
ATTORNEY July 2, 1929.   F. J. BERNARD   1,719,498
COFFEE PERCOLATOR
Filed May 16, 1928   2 Sheets-Sheet 2
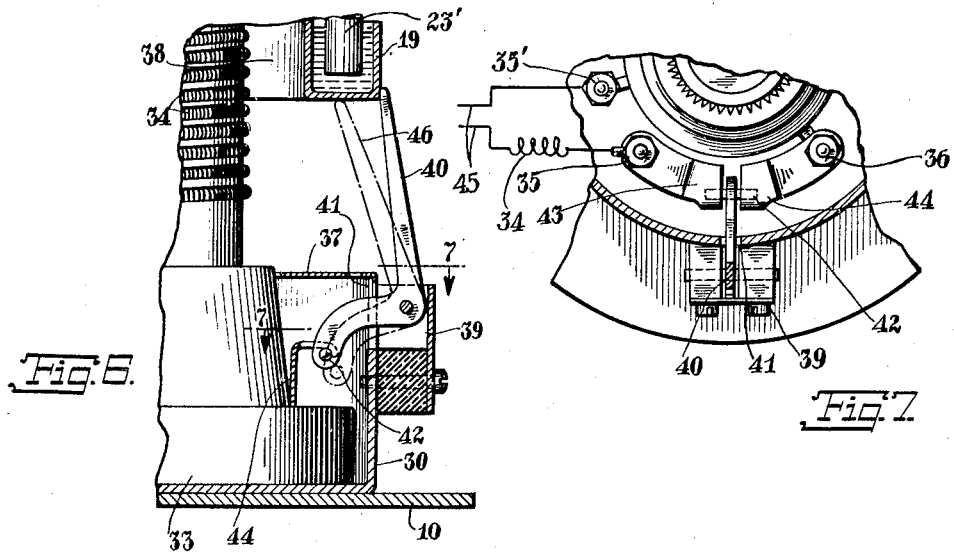
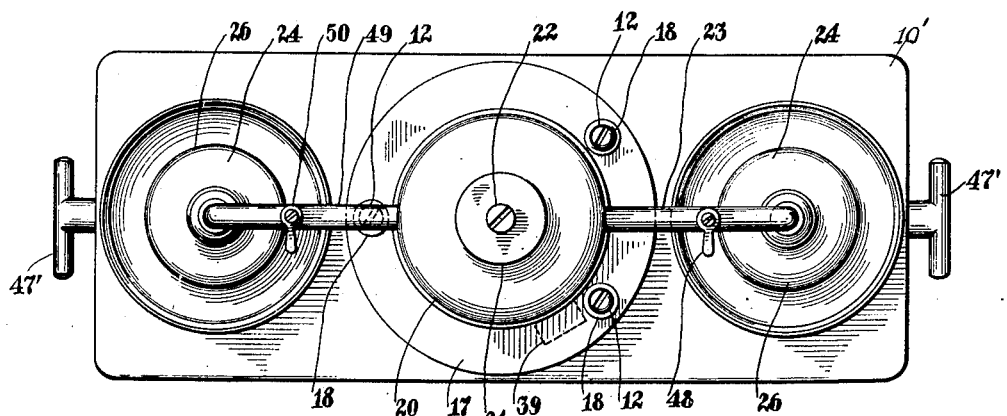
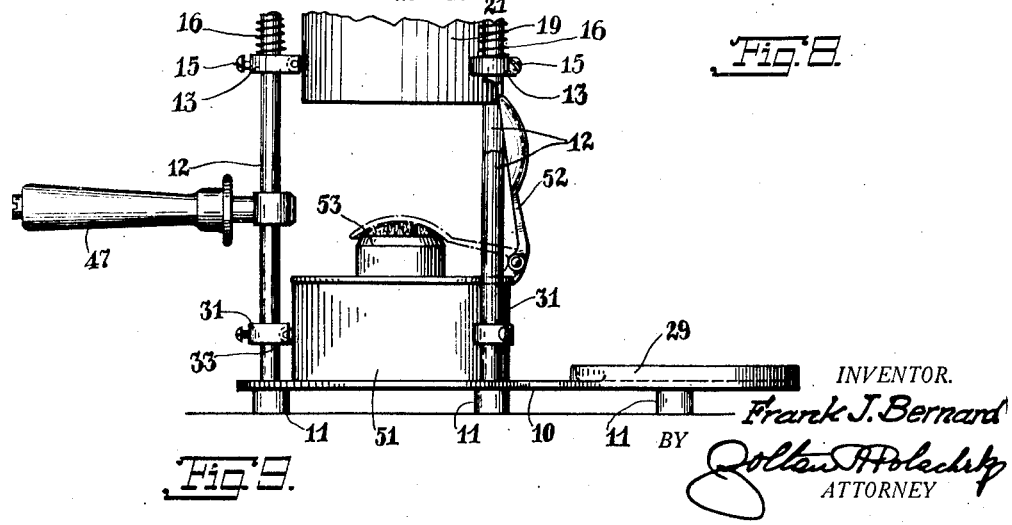
INVENTOR.
Frank J. Bernard
BY
ATTORNEY Patented July 2, 1929.

1,719,498

UNITED STATES PATENT OFFICE.

FRANK J. BERNARD, OF NEW YORK, N. Y.

COFFEE PERCOLATOR.

Application filed May 16, 1928. Serial No. 278,119.

This invention relates generally to kitchen utensils, and has more particular reference to a novel coffee percolator.

The invention has for an object the provision of a device of the class mentioned which is of simple durable construction, desirable and efficient in action, and which can be manufactured and sold at a reasonable cost.

The invention proposes the use of a water boiler provided with a steam outlet pipe connected with a container for holding coffee, tea or the like, and arranged for directing steam thoroughly and completely therethru and formed with a bottom drip connection thru which liquid tea or coffee may pass. It should be understood that the hot steam acting upon coffee or tea draws out the true flavor thereof and condenses into a liquid referred to as passing thru the bottom drip connection. The device is provided with a means for heating the boiler, and an automatic switch device for cutting off the operation of the said heating device when the water level in the boiler becomes too low.

For further comprehension of the invention, and of the objects and advantages thereof, reference will be had to the following description and accompanying drawings, and to the appended claims in which the various novel features of the invention are more particularly set forth.

In the accompanying drawing, forming a material part of this disclosure:—

Fig. 1 is a plan view of a device constructed according to this invention.

Fig. 2 is a side elevational view thereof.

Fig. 3 is a central vertical sectional view of the coffee container, per se.

Fig. 4 is a fragmentary vertical sectional view, taken on the line 4—4 of Fig. 1, the boiler not being shown in section.

Fig. 5 is a fragmentary vertical sectional view, taken on the line 5—5 of Fig. 2, a portion thereof not being shown in section.

Fig. 6 is a fragmentary vertical sectional view, taken on the line 6—6 of Fig. 1.

Fig. 7 is a fragmentary horizontal sectional view, taken on the line 7—7 of Fig. 6.

Fig. 8 is a plan view of the device constructed according to modified form.

Fig. 9 is a fragmentary side elevational view of the device constructed according to another modified form.

The reference numeral 10 indicates generally a plate base member having rubber rest members 11 secured to the bottom thereof, and three rods 12 vertically disposed and secured to the top side thereof. Collars 13 with rollers 14 are adjustably mounted on the rods 12 by reason of set screws 15.

Coaxially mounted on the rods 12 are helical expansion springs 16 acting between the collars 13 and a boiler support ring 17 slidably mounted on the rods 13, and held against displacement by stop collars 18 fixed on the said rods. A boiler 19 fits snugly within the ring 17 and has a projecting shoulder 20 resting on the ring for supporting the boiler. The rollers 14 touch the sides of the boiler for holding it in a steady position.

The boiler 19 has a top opening for entering water, which is normally closed by a plug 21 provided with a safety valve 22. A pipe 23 connects with the top of the boiler and with the top of a container cover 24 in which a convex apertured plate 25 is secured. The end of pipe 23 which is connected with the boiler 19 extends into the boiler as at 23′ and terminates near the bottom of the tank to allow the boiling water to be pressed therein by the steam formed at the top of the container. A container 26 for holding coffee, tea, or the like is attached to the cover 24 by a bayonet slot and pin arrangement 27. A screen 28 is secured in the container near its bottom, and the bottom of the container is open and of reduced neck shape 26′ providing a drip for liquid passing thru the container. Directly beneath the container 26 and secured to the base 10 is a ring member 29 for correctly positioning a vessel beneath the drip of the container.

A cup-shaped circular casing 30 rests on the base 10 and is disposed between the rods 12 and between collars 31 with rollers 32, fixed on the rods 12. A porcelain bracket 33 is secured within the casing 30 and projecting therefrom upwards, and at its top is provided with a heating winding 34 electrically connected with terminals 35 and 35′ attached to the lower portion of the bracket. A cover 37 is disposed upon the top of the casing 30. The boiler 19 is formed with a hollow portion 38 for receiving the heating element 34.

A small bracket 39 is fastened to the casing 30, and a lever 40 is pivoted intermediate of its ends in this bracket, the top of the lever normally resting against the outside diameter of the tank 19, and the bottom of the lever extends thru apertures 41 in the casing 30 and in the cover 37, and into the interior of the casing 30. A transverse pin 42 is fixed in the inner end of the lever 40, and connects contact strips 43 and 44 connected with the terminals 35 and 35'. The contact strips are of spring metal and in these positions are under tension. Live leads 45 connect the terminals 35, 35' and the coil 34 in series as schematically shown in Fig. 7.

As illustrated the device is assumed to be ready for operation, that is, the tank 19 is full of water and container 26 full of coffee. Current flowing thru the coil 34 heats the tank 19 and the water therein changes to steam which forces the boiling water thru pipes 23 and 23'. The water acts upon the coffee within the container 26, and coffee liquid drips from the neck 26', and is caught in some vessel intended for this purpose and resting on the base 10 within the ring 29.

As the water within the tank 19 becomes low, the springs 16 will slightly raise the entire tank 19, and the contacts 43 and 44 under tension will throw the lever 40 inwards by reason of action upon the pin 42, to a position indicated by the dot dash lines 46, the lever maintaining this new position under the influence of gravity. The electrical circuit is now broken, and the device is inoperative. A handle 47 is attached to one of the rods 12 by which the device may be carried.

An aperture 23ᵃ is provided in the pipe 23' near the inner wall of tank 19 to allow the steam to spray pipe or goose neck 23, thereby aiding the flow of the boiling water.

The modified form of the device illustrated in Fig. 8 discloses the pipe 23 provided with a valve 48, and a second pipe 49 connected with the boiler 19 and with a second coffee or tea container 26, a valve 50 being disposed in the pipe 49. The base 10' of the device is of rectangular shape and provided with handles 47' for carrying purposes. In operation of the device, and by proper manipulation of the valves 48 and 50, either one or both of the containers 26 may be used. If both are used, one may hold coffee and the other tea.

In Fig. 9, an alcohol heater 51 has been shown disposed beneath the tank 19, and this heater is provided with a choking cover 52 arranged for resting in open position against the outside diameter of the tank 19, and adapted for automatically closing over the flame of the heater, as indicated by the dot dash lines 53 when the tank 19 rises by reason of low water therein, and releases the choking cover.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A device of the class described, comprising a base, vertical posts secured thereto, collars attached to the posts, a tank support ring slidably mounted on the posts, expansion springs coaxially mounted on the posts between the collars and the said ring, a boiler with a shoulder supported by the said ring, a coffee container connected for receiving flowing boiling water from the boiler, a handle attached on one of the said vertical posts, below the said collar attached on the post, and a means for heating the boiler for the formation of steam to force the boiling water out of the boiler, adapted for inoperation upon the raising of the boiler.

2. A device of the class described, comprising a base, vertical posts secured thereto, collars attached to the posts, a tank support ring slidably mounted on the posts, collars secured to the posts for forming a stop for the support ring in upward motion only, expansion springs coaxially mounted on the posts between the collars and the said ring, a boiler supported by the said ring, a coffee container connected for receiving flowing boiling water from the boiler, a means for heating the boiler for the formation of steam to force the boiling water out of the boiler, adapted for inoperation upon the raising of the boiler, and other collars attached on the said rods near the said base for holding the heating means.

3. A device of the class described, comprising a base, vertical posts secured thereto, collars attached to the posts, a tank support ring slidably mounted on the posts, collars secured to the posts for forming a stop for the support ring in upward motion only, expansion springs coaxially mounted on the posts between the collars and the said ring, a boiler supported by the said ring, a coffee container connected for receiving flowing boiling water from the boiler, a means for heating the boiler for the formation of steam to force the boiling water out of the boiler, adapted for inoperation upon the raising of the boiler, and other collars with rollers attached on the said rods near the said base for holding the heating means.

4. In a device of the class described, a casing, a heater bracket therein, a cover on the casing, a lever pivotally mounted on the casing, a transverse pin carried on one end of the lever, spring contacts engageable by the pin under tension when the free end of the lever engages against the outer side of a boiler arranged for slight upward motion upon low water level for breaking the connection between the pin and the contacts.

5. A device of the class described, comprising a base, vertical posts secured thereto, collars attached to the posts, a tank support ring slidably mounted on the posts, expansion springs coaxially mounted on the posts between the collars and the said ring, a boiler with a shoulder supported by the said ring, a coffee container connected for receiving flowing boiling water from the boiler, and a means for heating the boiler for the formation of steam to force the boiling water out of the boiler, adapted for inoperation upon the raising of the boiler, the boiler being formed with a hollow bottom and the said heating means extends within the hollow in the bottom.

6. A device of the class described, comprising a base, vertical posts secured thereto, collars attached to the posts, a tank support ring slidably mounted on the posts, expansion springs coaxially mounted on the posts between the collars and the said ring, a boiler supported by the said ring, a coffee container connected for receiving flowing boiling water from the boiler, and a means for heating the boiler for the formation of steam to force the boiling water out of the boiler, adapted for inoperation upon the raising of the boiler.

7. A device of the class described, comprising a base, vertical posts secured thereto, collars adjustably attached to the posts, a tank support ring slidably mounted on the posts, expansion springs coaxially mounted on the posts between the collars and the said ring, a boiler supported by the said ring, a coffee container connected for receiving flowing boiling water from the boiler, and a means for heating the boiler for the formation of steam to force the boiling water out of the boiler, adapted for inoperation upon the raising of the boiler.

8. A device of the class described, comprising a base, vertical posts secured thereto, collars attached to the posts, a tank support ring slidably mounted on the posts, collars secured to the posts for forming a stop for the support ring in upward motion only, expansion springs coaxially mounted on the posts between the collars and the said ring, a boiler supported by the said ring, a coffee container connected for receiving flowing boiling water from the boiler, and a means for heating the boiler for the formation of steam to force the boiling water out of the boiler, adapted for inoperation upon the raising of the boiler.

9. A device of the class described, comprising a base, vertical posts secured thereto, collars attached to the posts, a tank support ring slidably mounted on the posts, expansion springs coaxially mounted on the posts between the collars and the said ring, a boiler with a shoulder supported by the said ring, a coffee container connected for receiving flowing boiling water from the boiler, and a means for heating the boiler for the formation of steam to force the boiling water out of the boiler, adapted for inoperation upon the raising of the boiler.

10. In a device of the class described, a casing, a heater bracket therein, a cover on the casing, a lever pivotally mounted on a bracket secured to the casing, a transverse pin carried on one end of the lever, spring contacts engageable by the pin under tension when the free end of the lever engages against the outer side of a boiler arranged for slight upward motion upon low water level for breaking the connection between the pin and the contacts.

11. A device of the class described, comprising a base, vertical posts secured thereto, collars attached to the posts, a tank support ring slidably mounted on the posts, expansion springs coaxially mounted on the posts between the collars and the said ring, a boiler supported by the said ring, a coffee container connected for receiving flowing boiling water from the boiler, and a means for heating the boiler for the formation of steam to force the boiling water out of the boiler, adapted for inoperation upon the raising of the boiler, including an alcohol heater.

In testimony whereof I have affixed my signature.

FRANK J. BERNARD.